(12) United States Patent
Chernikov

(10) Patent No.: US 10,536,635 B2
(45) Date of Patent: Jan. 14, 2020

(54) SYSTEMS AND METHODS FOR IMAGE-BASED LIGHT OUTPUT

(71) Applicant: Intelligent Security Systems Corporation, Woodbridge, NJ (US)

(72) Inventor: Konstantin Chernikov, Poselok Gornyackiy (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 0 days.

(21) Appl. No.: 16/246,059

(22) Filed: Jan. 11, 2019

(65) Prior Publication Data

US 2019/0222753 A1 Jul. 18, 2019

Related U.S. Application Data

(60) Provisional application No. 62/616,771, filed on Jan. 12, 2018.

(51) Int. Cl.
*H04N 5/232* (2006.01)
*G06T 15/20* (2011.01)
*G06T 1/00* (2006.01)

(52) U.S. Cl.
CPC ....... *H04N 5/23238* (2013.01); *G06T 1/0007* (2013.01); *G06T 15/20* (2013.01); *H04N 5/23206* (2013.01)

(58) Field of Classification Search
CPC ............ H04N 5/23238; H04N 5/23206; G06T 1/0007; G06T 15/20
See application file for complete search history.

(56) References Cited

U.S. PATENT DOCUMENTS

| | | | |
|---|---|---|---|
| 6,281,806 B1 | 8/2001 | Smith et al. | |
| 7,914,187 B2 | 3/2011 | Higgins-Luthman et al. | |
| 8,183,991 B2 | 5/2012 | Yagi et al. | |
| 8,423,431 B1* | 4/2013 | Rouaix | B65G 1/1373 705/28 |
| 2004/0051644 A1* | 3/2004 | Tamayama | G08B 7/066 340/686.1 |
| 2009/0033757 A1 | 2/2009 | Shimada | |

(Continued)

FOREIGN PATENT DOCUMENTS

DE 202013007109 U1 11/2013
JP 2000318513 A 11/2000

(Continued)

OTHER PUBLICATIONS

International Search Report and Written Opinion, dated Mar. 29, 2019, issued in corresponding International Application No. PCT/US19/12859, 11 pages.

*Primary Examiner* — Jason A Flohre
(74) *Attorney, Agent, or Firm* — Eric L. Sophir; Dentons US LLP

(57) ABSTRACT

Broadly, this disclosure discloses various computing technologies that include a processor in communication with an imaging device and with an illumination device. The processor receives a set of imaging data from the imaging device such that the processor is able to identify an object within the set of imaging data and determine a set of coordinates. The processor then sends the set of coordinates to the illumination device such that the illumination device can output an illumination based on the set of coordinates.

30 Claims, 4 Drawing Sheets

(56) References Cited

U.S. PATENT DOCUMENTS

| | | | |
|---|---|---|---|
| 2009/0309710 A1 | 12/2009 | Kakinami | |
| 2010/0289664 A1* | 11/2010 | Mizushima | H04N 9/3129 340/691.6 |
| 2011/0115969 A1* | 5/2011 | Whillock | H04N 5/2256 348/370 |
| 2011/0205497 A1* | 8/2011 | Wakabayashi | G02B 26/101 353/28 |
| 2014/0176599 A1* | 6/2014 | Watanabe | G06K 9/00228 345/619 |
| 2015/0222842 A1* | 8/2015 | Kwong | H04N 9/3182 348/745 |
| 2015/0317835 A1* | 11/2015 | Byers | H04L 65/1083 345/633 |
| 2016/0188123 A1* | 6/2016 | Fujiune | H04N 9/3114 345/156 |
| 2018/0089749 A1* | 3/2018 | Biermann | G06Q 30/0639 |
| 2018/0278840 A1* | 9/2018 | Narikawa | H04N 5/23216 |

FOREIGN PATENT DOCUMENTS

| | | |
|---|---|---|
| JP | 2005205950 A | 8/2005 |
| JP | 2006341713 A | 12/2006 |
| JP | 4840203 B2 | 12/2011 |
| RU | 2541505 C2 | 2/2015 |
| WO | WO2017165627 A1 | 9/2017 |

\* cited by examiner

SYSTEMS AND METHODS FOR IMAGE-BASED LIGHT OUTPUT

CROSS-REFERENCE TO RELATED APPLICATIONS

This application claims a benefit of priority to U.S. Provisional Patent Application 62/616,771 filed on Jan. 12, 2018, which is herein incorporated by reference in its entirety for all purposes.

TECHNICAL FIELD

Generally, this disclosure relates to image processing. More particularly, this disclosure relates to image-based light output.

BACKGROUND

In an industrial setting, whether indoors or outdoors, such as a warehouse, a factory, a dock, an energy plant, or others, a user, whether a human or a machine, may need to know where a first zone ends and a second zone begins or vice versa. For example, the first zone can include a safe zone, a safety equipment required zone, or others. Likewise, the second zone can include a hazardous zone, a no mobile device zone, or others. As such, the industrial setting hosts a set of signs or surface markers, inclusive of a paint or a tape, such as a floor sign or marker, a wall sign or marker, a ceiling sign or marker, or others, that notify the user where the first zone ends and the second zone begins or vice versa. However, the set of signs or surface markers often break, fade, or get erased, whether chemically, such as due to chemicals present in air, or mechanically, such as via a clothing item, a shoe sole, a tire, a continuous track, or others. Similarly, the set of signs or markers is often difficult to recognize or see, such as under a poor lighting condition, a bad weather environment, a dusty environment, or others. Resultantly, the user has difficult time identifying where the first zone ends and the second zone begins or vice versa. Furthermore, in the industrial setting, since the set of signs or markers is constantly present, a human user can get used to the set of signs or markers with time and thereby ignore the set of signs or markers. As such, this state of being can lead to an inefficient use of resources or a dangerous situation. Furthermore, in the industrial setting, there can arise a need to notify the user of a movement of an object, whether dangerous or non-dangerous, that can cause an injury or a damage upon impact, whether physical or non-physical, whether with the user, another user, or another object. These technical problems become even more acute cumulatively.

In a transportation setting, whether indoors or outdoors, such as on a road, a rail track, or others, a vehicular driver, whether a human or a machine, may need to be notified of a presence of an object in a vehicular path, especially in a poorly illuminated environment, such as a tunnel or an overpass, in a bad weather environment, or at nighttime. For example, the object can include an animate object, such as a human or an animal, or an inanimate object, such as a trash item, a pile of snow, a fallen tree, a crate, or others. Likewise, when the vehicular path is not regulated or unmarked, the vehicular driver may be even further in need of being notified of the presence of the object. These technical problems become even more acute cumulatively.

In a public space setting having a large number of people, whether indoors or outdoors, such as an airport, a train station, a bus station, a park, a museum, a mall, a school, a stadium, a concert hall, or others, a user, whether a human or a machine, may need to detect a suspicious object and notify at least some of the people or a security personnel of the suspicious object. For example, the suspicious object can include an unattended bag/suitcase/container, a suspicious human movement, a suspicious vehicular movement, or others. These technical problems become even more acute cumulatively.

SUMMARY

Broadly, this disclosure discloses various computing technologies that address various problems identified above. These computing technologies include a processor in communication with an imaging device, such as a video camera, and with an illumination device, such as a laser projector. The processor receives a set of imaging data from the imaging device such that the processor is able to identify an object within the set of imaging data and determine a set of coordinates. The processor then sends the set of coordinates to the illumination device such that the illumination device can output an illumination based on the set of coordinates.

In an embodiment, there is provided a method comprising: receiving, by a server, a video stream from a camera, wherein the video stream depicts an object that is moving along a current path; detecting, by the server, the object in the video stream; determining, by the server, a projected path of the object based on the current path; generating, by the server, a set of coordinates based on the projected path; sending, by the server, the set of coordinates to a laser projector such that the laser projector can project a laser beam based on the set of coordinates as the object is moving in the projected path.

In an embodiment, there is provided a system comprising: a light source; and a server programmed to: receive a video stream from a camera, wherein the video stream depicts an object that is moving along a current path, detect the object in the video stream, determine a projected path of the object based on the current path, generate a set of coordinates based on the projected path, and send the set of coordinates to the light source such that the light source can source a light based on the set of coordinates as the object is moving in the projected path.

In an embodiment, there is provided a method comprising: receiving, by a server, a video stream from a camera, wherein the video stream depicts an object that is moving along a current path; detecting, by the server, the object in the video stream; determining, by the server, a projected path of the object based on the current path; generating, by the server, a set of coordinates based on the projected path; sending, by the server, the set of coordinates to a light source such that the light source can source a light based on the set of coordinates as the object is moving in the projected path.

In an embodiment, there is provided a method comprising: receiving, by a processor, a set of imaging data from an imaging device, wherein the set of imaging data depicts an object; identifying, by the processor, the object in the set of imaging data; generating, by the processor, a set of coordinates based on the object; and sending, by the processor, the set of coordinates to an illumination device such that the illumination device can output an illumination based on the set of coordinates.

DETAILED DESCRIPTION

Figure 1:
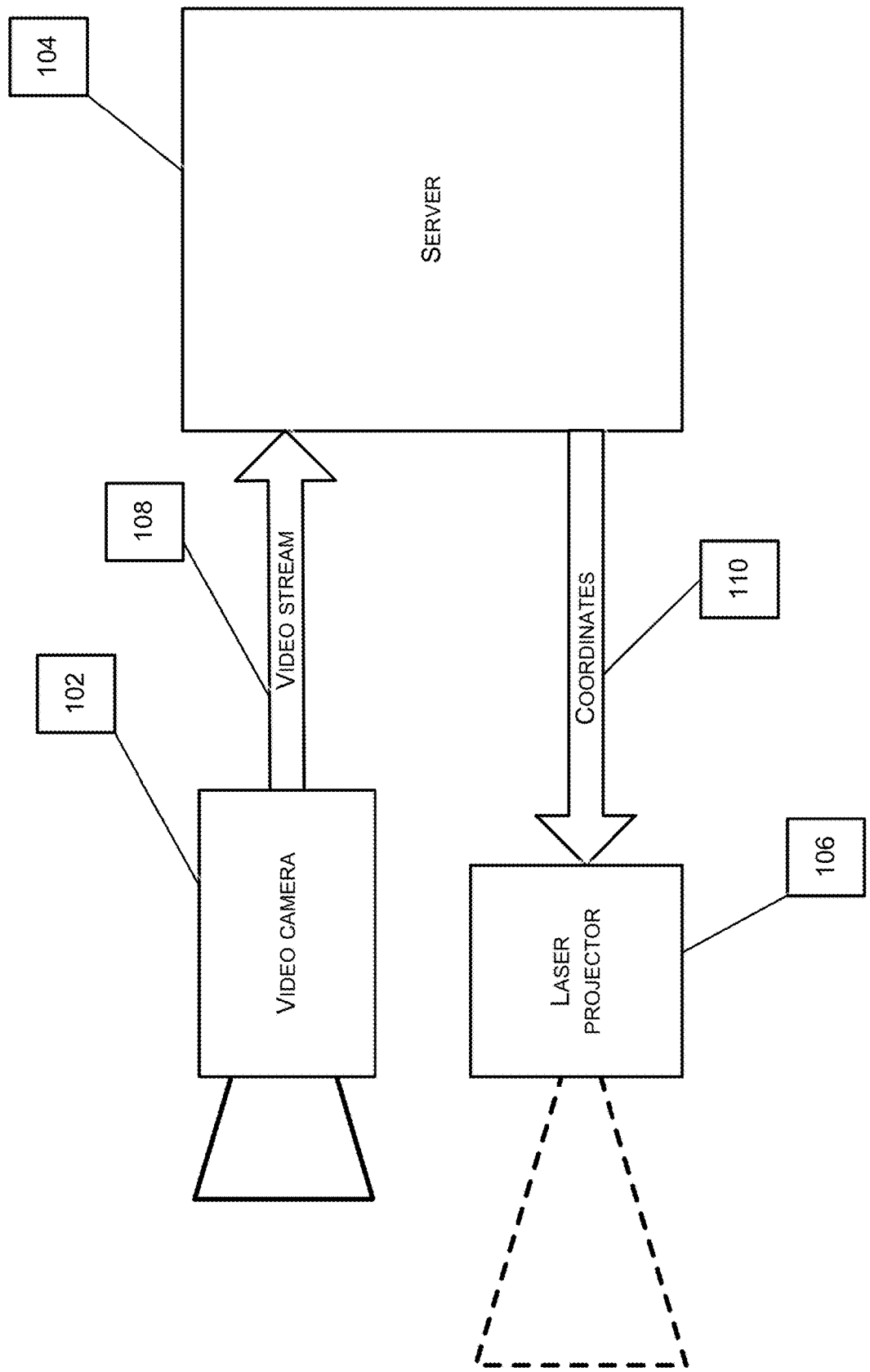
FIG. 1 shows a schematic diagram of an embodiment of a system for an image-based light output according to this disclosure.

Broadly, this disclosure discloses various computing technologies that include a processor in communication with an imaging device, such as a video camera, and with an illumination device, such as a laser projector. The processor receives a set of imaging data from the imaging device such that the processor is able to identify an object within the set of imaging data and determine a set of coordinates. The processor then sends the set of coordinates to the illumination device such that the illumination device can output an illumination based on the set of coordinates. Note that although the imaging device can capture optically, these computing technologies can be applied to non-optical capture as well, such as via an ultrasound machine, an X-ray machine, an magnetic resonance imaging (MRI) machine, a radar, a LIDAR, a laser, a heat sensor, or any other form of image formation through any input means or modality. Likewise, note that although the illumination device can be laser-based, these computing technologies can be applied to non-laser illumination as well, such as via a flashlight, a spotlight, a searchlight, a flash illumination device, a lamp projector, a light emitting diode (LED), an LED bulb, an LED lamp, an incandescent bulb or lamp, a halogen bulb or lamp, a gas discharge bulb or lamp, or any other form of light output, whether in an electromagnetic spectrum visible or invisible to a human eye, through any output means or modality.

This disclosure is now described more fully with reference to FIGS. 1-4, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

FIG. 1 shows a schematic diagram of an embodiment of a system for an image-based light output according to this disclosure. In particular, a system 100 includes a video camera 102, a server 104, and a laser projector 106, where the server 104 is in communication with the video camera 102 to receive a video stream 108 and the laser projector 106 to send a set of coordinates 110.

The video camera 102 includes an optical instrument for capturing and recording images, which may be stored locally, transmitted to another location, or both. The images may be individual still photographs or sequences of images constituting videos. The images can be analog or digital, whether color or grayscale. The video camera 102 can comprise any type of lens, such as convex, concave, fisheye, or others. The video camera 102 comprise any focal length, such as wide angle or standard. The video camera 102 can be stationary or movable such that the video camera 102 is directed to a zone of observation.

The video camera 102 is powered via a mains electricity source, such as via a power cable or a data cable. In some embodiments, the video camera 102 is powered via at least one of an onboard rechargeable battery, such as a lithium-ion battery, which may be charged via an onboard renewable energy source, such as a photovoltaic cell, a wind turbine, or a hydropower turbine. The video camera 102 can be configured for geo-tagging, such as via modifying an image file with a geolocation or a set of coordinates data. The video camera 102 can include or be coupled to a microphone. The video camera 102 can be a pan-tilt-zoom (PTZ) camera, which can be a virtual PTZ camera. The video camera 102 can be configured for a name-stamping, date-stamping, or time-stamping the image, such as what date or time the image was captured or naming the image with a naming convention, as pre-programmed in advance. The video camera 102 can comprise a flash illumination output device or another artificial illumination output device. The video camera 102 can comprise an infrared illumination output device. Note that although the video camera 102 can capture optically, this disclosure supports non-optical capture as well, such as via an ultrasound machine, an X-ray machine, an MRI machine, a radar, a LIDAR, a laser, a heat sensor, or any other form of image formation through any input means or modality.

The server 104 runs an operating system, such as MacOS®, Windows®, or others, and an application, such as a video analytics application, on the operating system. For example, at least one of the video camera 102, the server 104, or the laser projector 106 can be components of a video management system (VMS). The server 104 can include or be coupled to an input device, such as a mouse, a keyboard, a camera (whether forward-facing or back-facing), an accelerometer, a touchscreen, a biometric reader, a clicker, a microphone, a stylus, or any other suitable input device. The server 104 can include or be coupled to, an output device, such as a display, a speaker, a headphone, a printer, or any other suitable output device. In some embodiments, the input device and the output device can be embodied in one unit, such as a touch-enabled display, which can be haptic. In some embodiments, the server 104 hosts a software module configured to perform a set of situational video analytics on the video stream 108.

The server 104 can be in communication with a client that runs an operating system, such as MacOS®, Windows®, or others, and an application, such as an administrator application, on the operating system. For example, the client can be embodied as a workstation, a terminal, a laptop, a tablet, a smartphone, a vehicle, whether manned or unmanned, whether land, aerial, or marine, or others. The client can include or be coupled to an input device, such as a mouse, a keyboard, a camera (whether forward-facing or back-facing), an accelerometer, a touchscreen, a biometric reader, a clicker, a microphone, a stylus, or any other suitable input device. The client can include or be coupled to an output device, such as a display, a speaker, a headphone, a printer, or any other suitable output device. In some embodiments, the input device and the output device can be embodied in one unit, such as a touch-enabled display, which can be haptic. As such, the application can present an administrator graphical user interface (GUI) configured to depict a page, where the page can include a visual element, such as a menu, enabling a control of an aspect of the system 100, such as any hardware, software, or any other logic or functionality. For example, the client can be configured to control at least one of the video camera 102, the server 104, or the laser projector 106. For example, the client can receive a set of imagery, whether photos or videos, from the camera 102, whether from the server 104 or the camera 102.

The laser projector 106 is configured to project a laser beam, such as a red beam, a blue beam, or others, such as to provide an optical guidance, whether in an electromagnetic spectrum visible or invisible to a human eye. For example, the laser projector 106 can project the laser beam without a diffraction grating. The laser projector 106 includes a housing that contains a laser source, a mirror, and other optical components. For example, the laser projector 106 can contain one laser light source for a single-color projection or three sources for a red, green, and blue (RGB) full color projection. For example, the laser projector 106 can include a laser diode configuration (direct injection), a solid state configuration (diode-pumped, frequency-doubled), a gas laser configuration, or others. For example, the laser projector 106 can provide a fast and stable project with a high repetition rate of about 50 hertz (Hz) and a wide optical angle of about 80 degrees by about 80 degrees. For example, the laser beam can depict a dot, a line, whether solid or broken, a shape, whether open or closed, an image, a video, or others. For example, the laser projector 106 can create an image projection based on the set of coordinates 110 received from the server 104. The laser projector 106 can be stationary or movable. The laser projector 106 is powered via a mains electricity source, such as via a power cable or a data cable. In some embodiments, the laser projector 106 is powered via at least one of an onboard rechargeable battery, such as a lithium-ion battery, which may be charged via an onboard renewable energy source, such as a photovoltaic cell, a wind turbine, or a hydropower turbine. The laser projector 106 can include or be coupled to a microphone or the video camera 102, which can be embodied as a single unit. Note that although the laser projector 106 can project the laser beam, this disclosure supports non-laser illumination as well, such as via a flashlight, a spotlight, searchlight, a flash illumination device, a lamp projector, an LED, an LED bulb, an LED lamp, an incandescent bulb or lamp, a halogen bulb or lamp, a gas discharge bulb or lamp, or any other form of light output, whether in an electromagnetic spectrum visible or invisible to a human eye, through any output means or modality.

Resultantly, the server 104 can process the video stream 108 to detect an event or an object, as depicted via the video stream 108, classify the event or the object, and act accordingly. For example, the server 104 can detect the event or the object, as disclosed in U.S. Pat. No. 9,609,197, which is herein incorporated by reference for at least these purposes and all other purposes relevant to this disclosure, as disclosed herein. Further for example, the server 104 can act through the laser projector 106 by sending the set of coordinates 110 to the laser projector 106 such that the laser projector 106 can visibly outline or visibly accompany the object that moves into an optical view of the video camera 102 or vice versa or a specified zone.

In one mode of operation, the server 104 receives the video stream 108 from the video camera 102, where the video stream depicts an object, such as a human, that is moving along a current path, such as walking along a rectilinear plane. For example, when the video stream 108 is distorted, the server 104 can perform a dewarping process as disclosed in U.S. Pat. No. 9,547,883 or 9,609,197, both of which are incorporated by reference herein for all purposes. The server 104 processes the video stream 108 such that the server 104 detects the object in the video stream 108, determines a projected path of the object based on the current path, and generates the set of coordinates 110, such as for the object itself or for a specified zone, based on the projected path, which can be rectilinear, arcuate, sinusoidal, circular, oval, pentagonal, triangular, or others. The server 104 then sends the set of coordinates 110 to the laser projector 106 such that the laser projector 106 can project a laser beam based on the set of coordinates 110 as the object is moving in the projected path, whether tracing the object, illuminating the object, tracing another object in proximity of the object, illuminating another object in proximity of the object, delineate an area proximal or distal to the object, or other forms of light output. The laser projector 106 can move to project the laser beam based on the set of coordinates 110 as the object is moving in the projected path or the laser projector 106 can remain stationary to project the laser beam based on the set of coordinates 110 as the object is moving in the projected path. The laser beam can be in an electromagnetic spectrum visible to a human eye based on the set of coordinates 110 as the object is moving in the projected path. The laser projector 106 can project the laser beam in an image form based on the set of coordinates 110 as the object is moving in the projected path. The laser beam can be in a single color, as selected through an identifier by the server 104 based on processing the video stream 108, or a set of multiple colors, as selected through a set of identifiers by the server 104 based on processing the video stream 108. The server 104 can process the video stream 108 such that the server 104 is able to estimate a size of the object, a generate a value corresponding to the size of the object, and send the value to the laser projector 106 such that the laser projector 106 can project the laser beam based on the set of coordinates 110 and the value as the object is moving in the projected path. Where visibility of the laser beam is desired, the server 104 can process the video stream 108 such that the server 104 is able to determine a first characteristic of a surface onto which the laser beam will be projected, such as a color of the surface or a texture of the surface, from the video stream 108. The server 104 then can determine a second characteristic of the laser projector 106, such as a color ability of the laser projector 106 or a visual pattern ability of the laser projector 106, based on the first characteristic, where the second characteristic is associated with the laser beam. Subsequently, the server 104 can send the second characteristic to the laser projector 106 such that the laser projector 106 can project the laser beam onto the surface based on the second characteristic, which would allow for suitable contrast or visibility of the laser beam, as the object is moving in the projected path.

Figure 2:
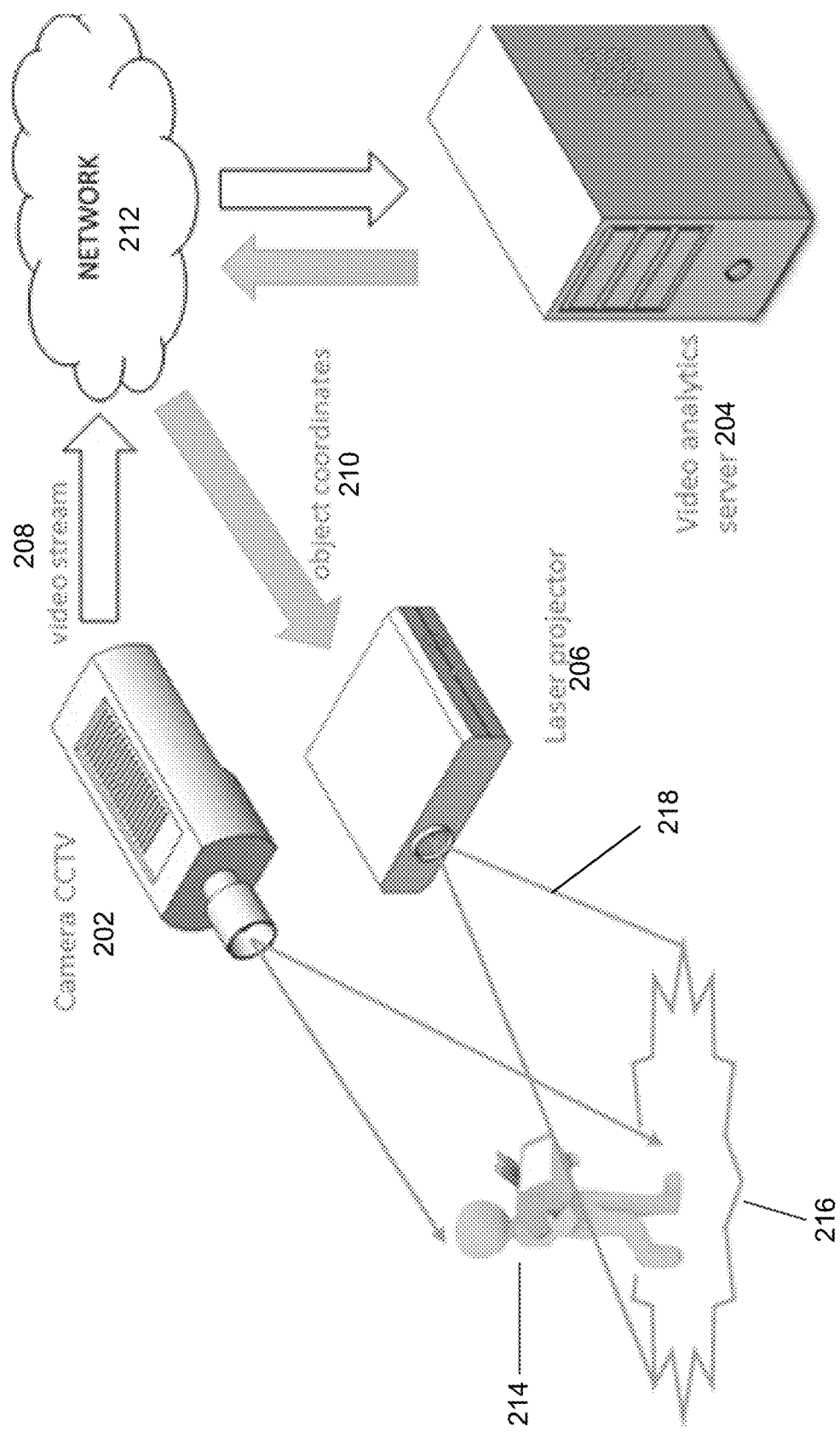
FIG. 2 shows a schematic diagram of an embodiment of a system for an image-based light output according to this disclosure.

FIG. 2 shows a schematic diagram of an embodiment of a system for an image-based light output according to this disclosure. In particular, a system 200 includes a camera 202, a server 204, a laser projector 206, and a network 212. The camera 202 can be configured as the camera 102. The server 204 can be configured as the server 104. The laser projector 206 can be configured as the laser projector 106.

The network 212 includes a plurality of nodes that allow for sharing of resources or information. The network 212 can be wired or wireless. For example, the network 212 can be a local area network (LAN), a wide area network (WAN), a cellular network, or others. The server 204 is in communication with the camera 202 over the network 212 such that the server 204 can receive a video stream 208 from the camera 202. The server 204 is in communication with the laser projector 206 over the network 212 such that the server 204 can send a set of coordinates 210 to the laser projector 206. The video stream 208 depicts an object 214, such as a human walking in a path, which can be rectilinear. Accordingly, the server 204 receives the video stream 208 from the video camera 202 over the network 212, where the video stream 208 depicts the object 214 moving along a current path. For example, when the video stream 208 is distorted, the server 204 can perform a dewarping process as disclosed in U.S. Pat. No. 9,547,883 or 9,609,197, both of which are incorporated by reference herein for all purposes. The server 204 processes the video stream 208 such that the server 204 detects the object 214 in the video stream 208, determines a projected path of the object 214 based on the current path, and generates the set of coordinates 210, such as for the object 214, based on the projected path. The server 204 then sends the set of coordinates 210 to the laser projector 206 such that the laser projector 206 can project a laser beam 218 based on the set of coordinates 210 as the object 214 is moving in the projected path and thereby form a trace 216 of the object 214. However, note that other forms of illumination are possible, whether illuminating the object 214, tracing another object in proximity of the object 214, illuminating another object in proximity of the object 214, delineate an area proximal or distal to the object 214, or other forms of light output. The laser projector 206 can move to project the laser beam 218 based on the set of coordinates 210 as the object 214 is moving in the projected path or the laser projector 206 can remain stationary to project the laser beam based on the set of coordinates 210 as the object 214 is moving in the projected path. The laser beam 218 can be in an electromagnetic spectrum visible to a human eye based on the set of coordinates 210 as the object 214 is moving in the projected path. The laser projector 206 can project the laser beam in an image form based on the set of coordinates 210 as the object 214 is moving in the projected path. The laser beam 218 can be in a single color, as selected through an identifier by the server 204 based on processing the video stream 208, or a set of multiple colors, as selected through a set of identifiers by the server 204 based on processing the video stream 208. The server 204 can process the video stream 208 such that the server 204 is able to estimate a size of the object 214, a generate a value corresponding to the size of the object 214, and send the value to the laser projector 206 such that the laser projector 206 can project the laser beam 218 based on the set of coordinates 210 and the value as the object 214 is moving in the projected path. Where visibility of the laser beam 218 is desired, the server 204 can process the video stream 208 such that the server 204 is able to determine a first characteristic of a surface onto which the laser beam 218 will be projected, such as a color of the surface or a texture of the surface, from the video stream 208. The server 204 then can determine a second characteristic of the laser projector 206, such as a color ability of the laser projector 206 or a visual pattern ability of the laser projector 106, based on the first characteristic, where the second characteristic is associated with the laser beam 214. Subsequently, the server 204 can send the second characteristic to the laser projector 206 such that the laser projector 206 can project the laser beam 218 onto the surface, such as to form the trace 216, based on the second characteristic, which would allow for suitable contrast or visibility of the laser beam 218, as the object 214 is moving in the projected path.

Figure 3:
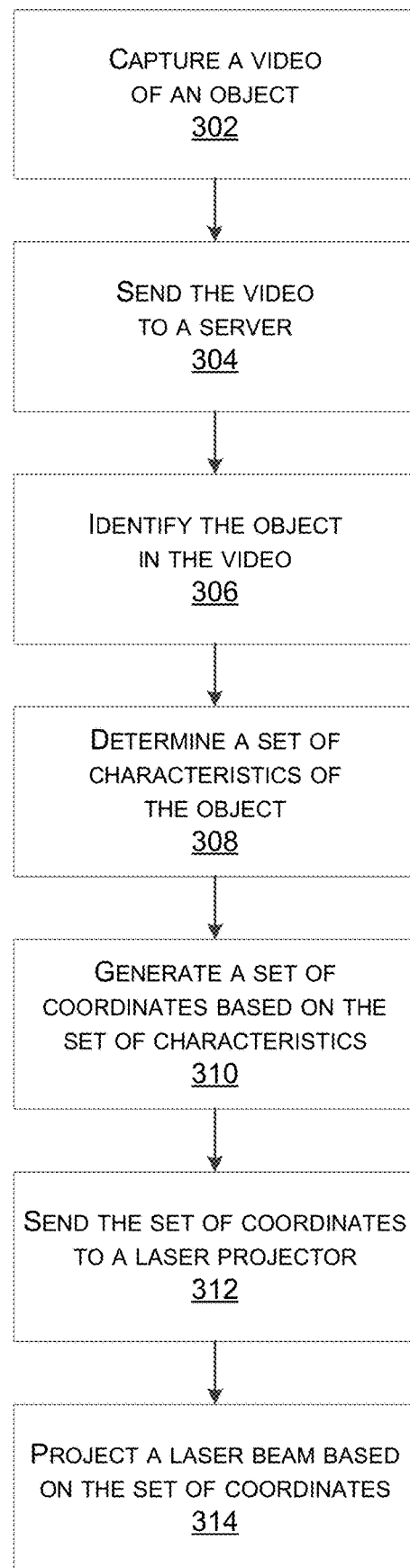
FIG. 3 shows a flowchart of an embodiment of a process for an image-based light output according to this disclosure.

FIG. 3 shows a flowchart of an embodiment of a process for an image-based light output according to this disclosure. A process 300 can be performed via the system 100 or the system 200. The process 300 includes a set of blocks 302-314.

In block 302, a camera, such as the camera 102 or 202, captured a video of an object, such as the video stream 108 or 208 depicting the object 214.

In block 304, the camera sends the video to a server, such as the server 104 or 204, which can be over the network 212.

In block 306, the server identifies the object in the video, which can be via various computer vision techniques. For example, the server can identify the object in the video through uses of different algorithms of processing of the video, which can include a separation of mobile objects based on integral and differential methods.

In block 308, the server determines a set of characteristics of the object. For example, the set of characteristics can include a size of the object, a shape of the object, an orientation of the object, a perimeter of the object, a volume of the object, a speed of the object, an acceleration of the object, a moving direction of the object, a classification of the object, or others. For example, the server can determine the set of characteristics through trainees (neural networks), or use different templates on which to illuminate certain signs.

In block 310, the server generates a set of coordinates based on the set of characteristics. For example, the set of coordinates can include a X-axis component, a Y-axis component, a Z-axis component, or others. For example, the set of coordinates can include an addressable component, such as an array element corresponding to a specified portion of a defined area. For example, the server generates the set of coordinates when the object is identified in the video, as per block 306.

In block 312, the server sends the set of coordinates to a laser project, such as the laser projector 106 or 206, which can over the network 212.

In block 314, the laser projector projects a laser beam based on the set of coordinates. For example, the laser projector can move, such as rotate, tilt, or travel, based on the set of coordinates and then project the laser beam. For example, when the laser projector obtains the set of coordinates, the laser projector can create a vector image using a trigonometric function, which allows the laser projector to transform the set of coordinates into a set of points based on which the laser beam will move in a pattern, such as in a line, a triangle, a rectangle, a polygon, or another shape, whether open or closed, to illustrate the vector image, such as via using the set of coordinates to represent peaks or vertices.

Figure 4:
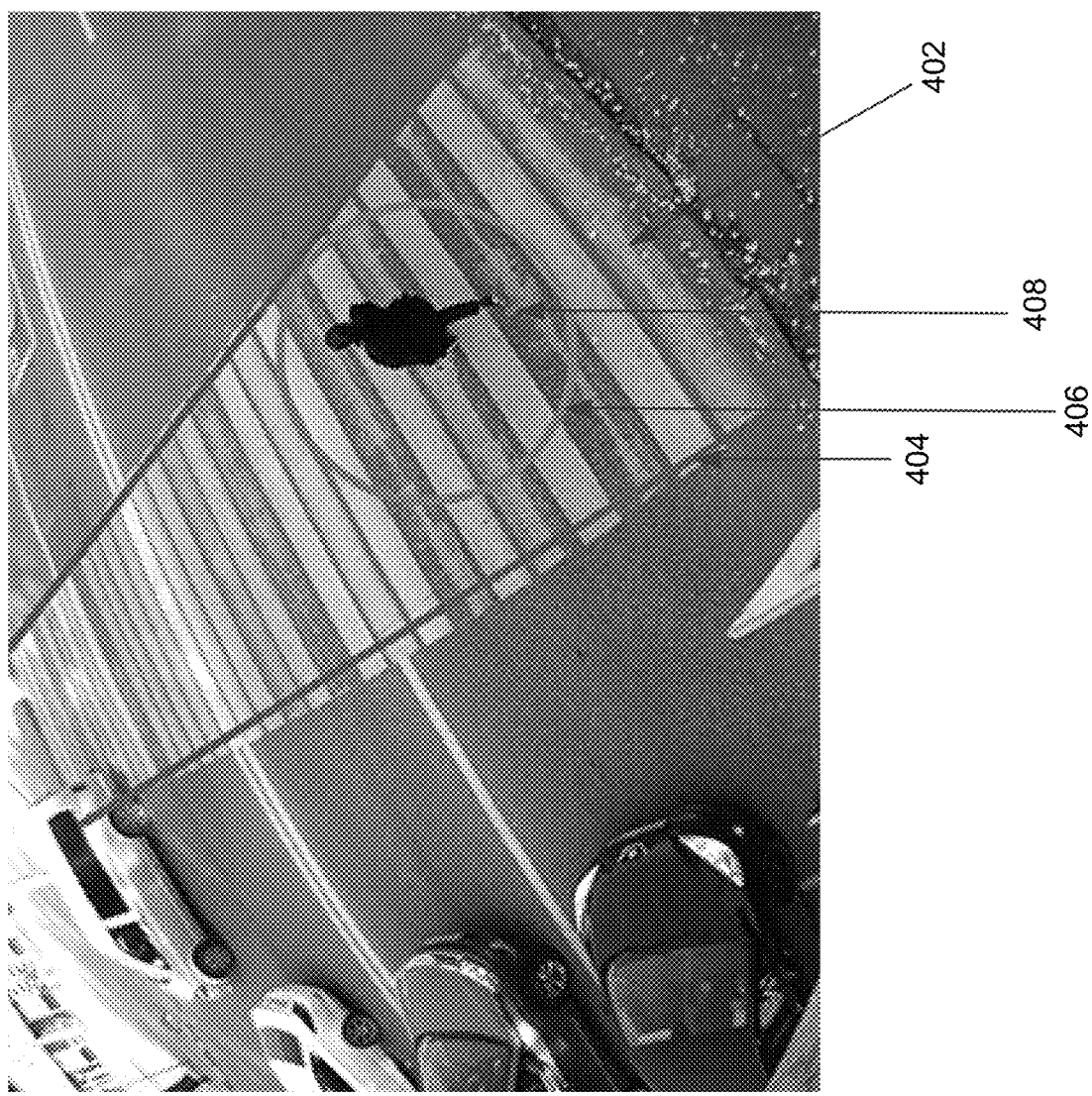
FIG. 4 shows a screenshot of an embodiment of an image-based light output according to this disclosure.

FIG. 4 shows a screenshot of an embodiment of an image-based light output according to this disclosure. As explained above, the system 100 or 200 can dynamically indicate, whether on a single or cumulative basis, an object, a zone, or a border, such as via highlighting, marking, tracing, outlining, or others, as selected via the server 104 or 204, based on a set of criteria, in real-time, as the object is optically captured via the video camera 102 or the camera 202. For example, the laser projector 106 or 206 can trace the object thereby creating a clear delineation or border, which are easily recognizable by a human bystander. Likewise, the server 104 or 204 can identify, classify, and make a decision about an appearance of a situation, which necessitates a supplemental illumination via the laser projector 106 or 206 of a border of a zone or an identified stationary or moving object. For example, the server 104 or 204 can be configured to classify an object and forecast a path of the object, such as via generating the set of coordinates 110 or 210 based on a size of the object, as determined via the server 104 or 204. For example, the laser projector 106 or 206 which can formulate a projection of an image on a surface based on the set of coordinates 110 or 210 or other relevant data received from the server 104 or 204. As such, this disclosure can be applied to a situation where there is a need for a user, such as a human, to clearly recognize a border of an area or an object to focus on or pay attention to because the laser projector 106 or 206 enables a formation of a contrast image to get attention from the user, raise awareness or vigilance, precisely determine a location of the object in a poor visual with the object to the area, such as a bad weather environment, a dusty environment, a polluted environment, a poorly illuminated environment, at nighttime, or others.

For example, in industrial setting embodiments, as explained above, the laser beam, whether visible or invisible, as projected via the laser projector 106 or 206, can assist a user when a set of signs or surface markers brakes, fades, or gets erased by supplementing or replacing the set of signs or surface markers with the laser beam. Likewise, the laser beam, as projected via the laser projector 106 or 206, can be easier for the user to recognize or see, such as under a poor lighting condition, a bad weather environment, a dusty environment, or others. Resultantly, the user has easier time identifying where a first zone ends and a second zone begins or vice versa. Furthermore, the laser beam, as projected via the laser projector 106 or 206, can minimize a human user from getting used to the set of signs or markers with time and ignoring the set of signs or markers by providing a non-familiar visual demarcation, thereby minimizing an inefficient use of resources or a dangerous situation. Furthermore, the laser beam, as projected via the laser projector 106 or 206, can notify the user of a movement of an object that can cause an injury or a damage upon impact.

For example, in transportation setting embodiments, as explained above, the laser beam, whether visible or invisible, as projected via the laser projector 106 or 206, can aid a vehicular driver in being notified of a presence of an object in a vehicular path, especially in a poorly illuminated environment, in a bad weather environment, or at nighttime. Likewise, the laser beam, as projected via the laser projector 106 or 206, can aid the vehicular driver in being notified of the presence of the object when the vehicular path is not regulated or unmarked.

As shown in FIG. 4, a screenshot 400 depicts a marked crosswalk 402 where a human user 408 is walking in a rectilinear path. The server 104 or 204 extracts the screenshot 400 from the video stream 108 or 208, as explained above. The server 104 or 204 identifies the human user 408 in the screenshot 400 via a computer vision technique, such as an object recognition technique, and positions a bounding box 406, which can be of any open or closed shape, such as a U-shape, a D-shape, a square, shape, a rectangular shape, or others, such that the bounding box 406 encloses the human user 408 and the human user 408 can be computationally tracked thereby. The server 104 or 204 then performs various video analytics on the video stream 108 or 208, inclusive of the human user 408 within the bounding box 406, such that the set of coordinates 110 or 210 for the human user 408 in the video stream 108 or 208 is generated, such as a set of object coordinates. The server 104 or 204 then sends the set of coordinates 110 or 210 to the laser projector 106 or 206 such that the laser projector 106 or 206 can project the laser beam (at least two red laser beams are shown in FIG. 4 although less or more is possible) onto the marked crosswalk 402 in proximity of the human user 408. For example, as shown in FIG. 4, the human user 408 is positioned between the two red laser beams, whether projected via a single or multiple laser projectors 106 or 206, and the two red laser beams are illuminating the marked crosswalk 402 along a plurality of lateral edges thereof, along the rectilinear path of the human user 408. Also, the laser projector 106 or 206 outputs another laser beam, which can correspond to the bounding box 406, in order to provide a dynamic tracing around the human user 408, such via the laser beam tracing the bounding box 406.

Correspondingly, the video stream 108 or 208, which sources the screenshot 400 and is displayed on a display of a client in communication with the server 104 or 204, while the human user 408 is walking in the rectilinear path on the marked crosswalk 402, can be augmented by depicting, such as via overlaying or insertion, a marking over or in the video stream 108 or 208, with the marking corresponding to a projected path of the laser beam based on the set of coordinates. For example, as shown in the screenshot 400, the display of the client displays, such as via overlying or insertion, at least two red lines corresponding to at least two projected paths of the at least two laser beams, which can be displayed as the human user 408 is walking in the rectilinear path on the marked crosswalk 402 and the at least two laser beams are beaming into the marked crosswalk 402, as shown in FIG. 4. Likewise, as shown in the screenshot 400, the display of the client displays, such as via overlying or insertion, a green shape, whether closed or open, corresponding to a projected trace of the laser beam, which can be displayed as the human user 408 is walking in the rectilinear path on the marked crosswalk 402 and the laser beam is tracing or outlining the human user 408, as shown in FIG. 4.

Note that the at least two red lines can be non-red, such as one can be green and another one can be orange. Also, note that the at least two red lines can be different from or identical to each other in color, shape, size or other characteristics. Further, note that the at least two red lines can be displayed on the display, while being identical to or different from what is projected by the laser projectors 106 or 206 in color, size, shape, or other characteristics. For example, the display can display three lines in yellow color and broken structure and the laser projectors 106 or 206 can project three lines in red color and solid in structure. Likewise, the green shape can vary in color, size, shape, and other characteristics.

Resultantly, the laser beam, whether visible or invisible, can notify the vehicular driver about the human user 408 on the marked crosswalk 402, while also being visibly forecasted on the display of the client, i.e., the laser beam providing a dynamic tracing around the human user 408, such via the laser beam tracing the bounding box 406, or the laser beam illuminating the marked crosswalk 402 along lateral edges thereof (vehicular driver notice), and displaying the marking in the video stream 108 or 208 corresponding to the projected path of the laser beam, whether via dynamic or static illumination (client notice).

For example, in public space setting embodiments having a large number of people, as explained above, the laser beam, whether visible or invisible, as projected via the laser projector 106 or 206, can help a user to detect a suspicious object and notify at least some of the people or a security personnel of the suspicious object. Resultantly, a VMS system, which has the camera 102 or 202, the server 104 or 204, and the laser projector 106 or 206, can be configured to analyze situation analytics and perform an analysis for a large amount of information. When the suspicious object is identified, the VMS can be configured to request the laser projector 106 or 206 to point and thereby localize the suspicious object for at least some of the people or the security personnel or a sensor, which shortens a search for the suspicious object in large areas.

In some embodiments, the client, such as a workstation, a laptop, a tablet, or others, can communicate with the server 104 or 204 and set an action setting, such as an alarm output, a communication message output, a control of a physical object, such as a gate, an engine, a motor, a vehicle, or others, when the object 214 in the video stream 108 or 208 is computationally detected, whether through image processing or a sensor, to cross over or pass a line or a demarcation, inclusive of entry or exit, formed by the laser beam of the laser projector 106 or 206. The client can save the action setting onto the server 104 or 204. For example, the action setting can include the server 104 or 204 requesting that an audio, vibratory, or light alarm device be activated, whether such device is digital or analog or local to or remote from the object 214 or the client. For example, the audio alarm device can include a bell, a siren, or a horn. For example, the action setting can include the server 104 or 204 sending or requesting that a text, email, social networking, or chat message be sent to a predefined or dynamically determined phone number or email address, which can be associated with the object 214, based on recognition and identification of the object 214 against a database of objects, which can be relational, in-memory, or others. As such, using such processing, when the object 214 in the video stream 108 or 208 is detected to cross over or pass the line or the demarcation, inclusive of entry or exit, formed by the laser beam of the laser projector 106 or 206, then the server 104 or 204 can request that an action in accordance with the action setting can be taken, such as an alarm message is generated and sent or an alarm device, such as a bell, a siren, or a horn, is activated. Note that the alarm device can output in other ways, such as via an illumination, a vibration, or others, whether analog or digital.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, those skilled in the relevant art will appreciate that various modifications, additions, substitutions and the like can be made without departing from the spirit of the disclosure, and these are, therefore, considered to be within the scope of the disclosure, as defined in the following claims.

What is claimed is:

1. A method comprising:
   receiving, by a server, a video stream from a camera, wherein the video stream depicts an object that is moving along a current path;
   detecting, by the server, the object in the video stream;
   performing, by the server, a classification of the object after the object is detected;
   determining, by the server, a projected path of the object based on the current path and the classification;
   generating, by the server, a set of coordinates based on the projected path;
   sending, by the server, the set of coordinates to a laser projector having a mirror such that the laser projector projects a laser beam via the mirror based on the set of coordinates as the object is moving in the projected path and traces the object in a shape via the laser beam while the object is moving in the projected path, wherein at least one of:
   the laser projector transforms the set of coordinates into a set of points such that the shape is formed based on the laser beam moving via the mirror along the points, or
   the shape includes a vertex, wherein the set of coordinates locates the vertex.

2. The method of claim 1, wherein the server sends the set of coordinates to the laser projector such that the laser projector projects the laser beam based on the set of coordinates as the object is moving in the projected path and thereby illuminate the object.

3. The method of claim 1, wherein the server sends the set of coordinates to the laser projector such that the laser projector projects the laser beam based on the set of coordinates as the object is moving in the projected path and thereby trace another object in proximity of the object.

4. The method of claim 1, wherein the server sends the set of coordinates to the laser projector such that the laser projector projects the laser beam based on the set of coordinates as the object is moving in the projected path and thereby illuminate another object in proximity of the object.

5. The method of claim 1, wherein the server sends the set of coordinates to the laser projector such that the laser projector moves to project the laser beam based on the set of coordinates as the object is moving in the projected path.

6. The method of claim 1, wherein the server sends the set of coordinates to the laser projector such that the laser projector remains stationary to project the laser beam based on the set of coordinates as the object is moving in the projected path.

7. The method of claim 1, wherein the server sends the set of coordinates to the laser projector such that the laser projector projects the laser beam in a spectrum visible to a human eye based on the set of coordinates as the object is moving in the projected path.

8. The method of claim 1, wherein the server sends the set of coordinates to the laser projector such that the laser projector projects the laser beam in an image form based on the set of coordinates as the object is moving in the projected path.

9. The method of claim 1, wherein the server sends the set of coordinates to the laser projector such that the laser projector projects the laser beam based on the set of coordinates to delineate an area as the object is moving in the projected path.

10. The method of claim 1, wherein the server sends the set of coordinates to the laser projector such that the laser projector projects the laser beam in a single color based on the set of coordinates as the object is moving in the projected path.

11. The method of claim 10, further comprising:
    selecting, by the server, an identifier of the single color; and
    sending, by the server, the identifier to the laser projector such that the laser projector projects the laser beam in the single color based on the identifier.

12. The method of claim 1, wherein the server sends the set of coordinates to the laser projector such that the laser projector projects the laser beam in a plurality of colors based on the set of coordinates as the object is moving in the projected path.

13. The method of claim 12, further comprising:
    selecting, by the server, a plurality of identifiers of the colors; and
    sending, by the server, the identifiers to the laser projector such that the laser projector projects the laser beam in the colors based on the identifiers.

14. The method of claim 1, further comprising:
    estimating, by the server, a size of the object;
    generating, by the server, a value corresponding to the size; and
    sending, by the server, the value to the laser projector such that the laser projector projects the laser beam based on the set of coordinates and the value as the object is moving in the projected path.

15. The method of claim 1, further comprising:
    determining, by the server, a first characteristic of a surface from the video stream;
    determining, by the server, a second characteristic of the laser projector based on the first characteristic, wherein the second characteristic is associated with the laser beam;
    sending, by the server, the second characteristic to the laser projector such that the laser projector projects the laser beam onto the surface based on the second characteristic as the object is moving in the projected path.

16. The method of claim 15, wherein the second characteristic is associated with a color of the surface.

17. The method of claim 15, wherein the second characteristic is associated with a texture of the surface.

18. The method of claim 1, wherein the projected path is rectilinear.

19. The method of claim 1, wherein the server sends the set of coordinates to the laser projector such that the laser projector projects the laser beam in a spectrum invisible to a human eye based on the set of coordinates as the object is moving in the projected path.

20. The method of claim 1, wherein the laser projector transforms the set of coordinates into the set of points such that the shape is formed based on the laser beam moving via the mirror along the points.

21. The method of claim 1, wherein the shape includes the vertex, wherein the set of coordinates locates the vertex.

22. The method of claim 1, wherein the object is a human moving along the projected path outdoors.

23. The method of claim 22, wherein the human is crossing a road at a marked crosswalk, wherein the laser projector projects a plurality of laser beams along the marked crosswalk such that the human is crossing the road between the laser beams.

24. A system comprising:
a light source; and
a server programmed to:
receive a video stream from a camera, wherein the video stream depicts an object that is moving along a current path,
detect the object in the video stream,
perform a classification of the object after the object is detected,
determine a projected path of the object based on the current path and the classification,
generate a set of coordinates based on the projected path, and
send the set of coordinates to the light source such that the light source sources a light based on the set of coordinates as the object is moving in the projected path and traces the object in a shape via the light while the object is moving in the projected path, wherein at least one of:
the light source transforms the set of coordinates into a set of points such that the shape is formed based on the light moving along the points, or
the shape includes a vertex, wherein the set of coordinates locates the vertex.

25. A method comprising:
receiving, by a server, a video stream from a camera, wherein the video stream depicts an object that is moving along a current path;
detecting, by the server, the object in the video stream;
performing, by the server, a classification of the object after the object is detected;
determining, by the server, a projected path of the object based on the current path and the classification;
generating, by the server, a set of coordinates based on the projected path;
sending, by the server, the set of coordinates to a light source such that the light source sources a light based on the set of coordinates as the object is moving in the projected path and traces the object in a shape via the light while the object is moving in the projected path, wherein at least one of:
the light source transforms the set of coordinates into a set of points such that the shape is formed based on the light moving along the points, or
the shape includes a vertex, wherein the set of coordinates locates the vertex.

26. The method of claim 25, wherein the light source includes a light emitting diode (LED) that sources the light.

27. The method of claim 26, wherein the LED is included in a lamp.

28. A method comprising:
receiving, by a processor, a set of imaging data from an imaging device, wherein the set of imaging data depicts an object;
identifying, by the processor, the object in the set of imaging data;
generating, by the processor, a set of coordinates based on the object; and
sending, by the processor, the set of coordinates to an illumination device such that the illumination device outputs an illumination based on the set of coordinates and traces the object in a shape via the illumination, wherein at least one of:
the illumination device transforms the set of coordinates into a set of points such that the shape is formed based on the illumination moving along the points, or
the shape includes a vertex, wherein the set of coordinates locates the vertex.

29. The method of claim 28, wherein the illumination device includes a light emitting diode (LED) that can output the illumination.

30. The method of claim 28, wherein the illumination device includes a laser projector that can output the illumination.

* * * * *